(12) United States Patent
Ogawa et al.

(10) Patent No.: US 6,430,308 B1
(45) Date of Patent: Aug. 6, 2002

(54) HANDWRITING VERIFICATION DEVICE

(75) Inventors: Isamu Ogawa; Takenori Kawamata; Fumio Yoda, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/229,989

(22) Filed: Jan. 14, 1999

(30) Foreign Application Priority Data

Feb. 23, 1998 (JP) .......................................... 10-040198

(51) Int. Cl.[7] .............................. G06K 9/34; G06K 9/50; G06K 9/78
(52) U.S. Cl. ...................................... 382/119; 382/215
(58) Field of Search ......................... 382/116, 119–123, 382/173, 179, 218, 219, 294, 215; 340/5.52, 5.53, 5.82, 5.83, 5.84; 356/71; 434/155; 713/186, 200; 348/156, 161; 178/18.03, 19.01, 19.04, 20.01, 20.03; 902/3–6

(56) References Cited

U.S. PATENT DOCUMENTS

| | | | |
|---|---|---|---|
| 5,730,468 A | | 3/1998 | Wirtz ........................... 283/70 |
| 5,745,598 A | * | 4/1998 | Shaw et al. ................... 382/209 |
| 5,930,380 A | * | 7/1999 | Kashi et al. ................. 382/119 |

FOREIGN PATENT DOCUMENTS

JP       A2-268373       11/1990       .......... G06F/15/62

\* cited by examiner

*Primary Examiner*—Leo Boudreau
*Assistant Examiner*—Brian Werner

(57) ABSTRACT

A handwriting verification device includes: a normalizing section for normalizing an inputted handwriting which has been subjected to sampling at regular intervals; a registered handwriting dictionary in which registered handwriting is accommodated; a correspondence making section for making the inputted handwriting, which has been normalized in accordance with the sampling points in the sampling, correspond to the registered handwriting, so that a portion of the inputted handwriting and a portion of the registered hand writing, which coincide with each other, can be made to correspond to each other; a segment making section for making the inputted handwriting and the registered handwriting to be a segment by allotting an interval between at least two continuous sampling points as a segment in accordance with the result of making correspondence; a characteristic extracting section for extracting the characteristics of the inputted handwriting and the registered handwriting for each segment; and a handwriting verification section for verification the inputted handwriting with the registered handwriting using the characteristic of each segment.

19 Claims, 4 Drawing Sheets

11: SIGNATURE INPUTTING REGION  10: TABLET
12: INPUT END BUTTON

HANDWRITING VERIFICATION DEVICE

BACKGROUND OF THE INVENTION

1. Field of the Invention

The present invention relates to a hand writing verification device for conducting the verification of handwriting in accordance with information of the handwriting. For example, the present invention relates to a hand writing verification device for ascertaining the truth of an inputted signature by verification information of the inputted signature with information of the previously registered signature.

2. Description of the Related Art

FIG. 5 is a view showing an example of information of handwriting obtained when handwriting of "Ogawa" is written on a tablet with an electronic pen. In this case, the point 20 is defined as a sampling point, at which sampling is conducted at regular intervals on information of a position and writing pressure on the tablet with which the electronic pen comes into contact. Also, in this case, the line 21 is defined as a stroke, which is a line of the sampling points obtained while the electronic pen is continuously coming into contact with the tablet. Accordingly, in the example shown in FIG. 5, information of the handwriting "Ogawa" inputted as an electronic signal is composed of 21 sampling points and 6 strokes.

As a method of ascertaining the truth of handwriting by verification a pattern of handwriting, which has been inputted as an electric signal, with a pattern of handwriting, which has been previously registered, for example, there is proposed a handwriting verification method which is disclosed in Japanese Unexamined Patent Publication No. 2-268373.

First, the conventional handwriting verification method will be explained as follows. FIG. 6 is a flow chart showing operation of the conventional handwriting verification device.

In step S11, the registered pattern is called. In this step, the registered pattern, which has been previously made of a signature of a person himself, is called. In step S12, the signature is inputted, that is, the signature of the writer is taken in as three-dimensional time series information of coordinate information and writing pressure information. In steps S13 and S14, normalization is conducted. In step S13, the number of sampling points is made to be the same value of L, and in step S14, the position and size of the signature are normalized.

In step S15, DP matching (dynamic programming matching) is used, and a time strain function is found so that a cumulative discrepancy between the registered pattern and the input pattern can be minimized.

In step S16, time of the input pattern is corrected by the above time strain function, and a discrepancy of the profile from the registered pattern is calculated as a first discrepancy. Formula (1) shows a discrepancy "d" between the sampling point, the order of which is "a" of Z reg of the registered pattern, and the sampling point, the order of which is "b" of Z inp of the inputted pattern. In formula (1), Wp ($0 \leq Wp \leq 1$) is a weighted coefficient, P reg is a piece of writing pressure information of the registered pattern, and P inp is a piece of writing pressure information of the input pattern.

$$d^2(a, b)=(1-Wp)|Z\ reg(a)-Z\ inp(b)|^2+Wp|P\ reg(a)-P\ inp(b)|^2 \quad (1)$$

Z reg=X reg(I)+i Y reg(I)
Z inp=X inp(I)+i Y inp(I)
I=1, 2, . . . , L
i=$\sqrt{-1}$.

In step S17, a cumulative discrepancy of the time strain function itself is calculated as a second discrepancy dm. The second discrepancy dm is defined by the following formula (2), wherein the time strain function is {a(k), b(k)}.

$$dm=\|a(k)-b(k)\|$$

$$\|a(k)-b(k)\|^2 = \frac{1}{K_k}\sum_{k=1}^{K}|a(k)-b(k)|^2 \quad (2)$$

$$a(1)=b(1)=1$$

$$a(K)=b(K)=L.$$

In step S18, the signature is verified using the first discrepancy and the second discrepancy.

As described above, according to the conventional signature verification method, a discrepancy of the profile is found as the first discrepancy by dynamic programming matching of the sampling point of the input pattern with the sampling point of the registered pattern. Further, a cumulative discrepancy of the time strain function itself is found as the second discrepancy, and the signature is verified using them.

However, in the conventional signature verification device described above, the following problems may be encountered. When the conventional signature verification device is used, it is impossible to precisely evaluate a local characteristic of the profile of the signature. That is, in the above method of dynamic programming matching, for example, when a plurality of sampling points are made to correspond to one sampling point, a difference of the coordinate value between the one sampling point and the plurality of sampling points, which are made to correspond to the one sampling point is made to be a local discrepancy, and also a difference of the writing pressure value between the one sampling point and the plurality of sampling points, which are made to correspond to the one sampling point, is made to be a local discrepancy. That is, only information of the above points is used, and information of the peripheries of the above points is not used. Therefore, it is impossible to precisely express a local difference of the profile.

Further, the following problems may be encountered in the conventional signature verification device. In the conventional signature verification device, all characteristics used in the verification are used when dynamic programming matching is conducted. Therefore, when the types of characteristics used in the verification are increased, processing time required for the signature verification is increased. That is, dynamic programming matching is conducted when coordinate information and writing pressure information are used as the characteristics used for the verification. However, in order to enhance the accuracy of the signature verification, it is necessary to add the types of characteristics used for the verification. Therefore, in accordance with the increased number of the characteristics to be added, processing time required for the signature verification is increased.

As described above, evaluation of the characteristics accompanied by a change in time is conducted only by the time strain function in the conventional signature verification device described above. Accordingly, it is impossible to conduct an accurate evaluation on the characteristics which change in accordance with a change in time. For example, it is impossible to conduct an evaluation on the characteristics such as a change in the writing pressure and a change in the writing speed which change in accordance with a change in time.

SUMMARY OF THE INVENTION

The present invention has been accomplished to solve the above problems, and therefore an object of the present invention is to provide a handwriting verification device characterized in that: a local difference in the handwriting can be accurately reflected in the verification of the handwriting; even when the types of characteristics used for the verification are increased, it is possible to suppress an increase in the processing time required for the signature verification; and an accurate evaluation can be conducted even on a characteristic which changes in accordance with a change in time.

According to one aspect of the present invention, there is provided a handwriting verification device comprising: a normalizing means for normalizing an inputted handwriting which has been subjected to sampling at regular intervals; a registered handwriting dictionary in which registered handwriting is accommodated; a correspondence making means for making the inputted handwriting, which has been normalized in accordance with the sampling points in the sampling, correspond to the registered handwriting, so that a portion of the inputted handwriting and a portion of the registered hand writing, which coincide with each other, can be made to correspond to each other; a segment making means for making the inputted handwriting and the registered handwriting to be a segment by allotting an interval between at least two continuous sampling points as a segment in accordance with the result of making correspondence; a characteristic extracting means for extracting the characteristics of the inputted handwriting and the registered handwriting for each segment; and a handwriting verification means for verification the inputted handwriting with the registered handwriting using the characteristic of each segment.

In the handwriting verification device according to another aspect of the invention, the correspondence making means makes correspondence using a difference between a coordinate value between the sampling points of the inputted handwriting, and a coordinate value between the sampling points of the registered handwriting.

In the handwriting verification device of another aspect of the invention, the characteristic extracting means changes at least in accordance with a change in time.

In the handwriting verification device of the next invention, the characteristic extracting means extracts at least the characteristics of both ends of the segment.

In the handwriting verification device of another aspect of the invention, the hand writing verification means conducts verification while excluding a portion of the segments when verification is conducted using the characteristic of each segment.

DETAILED DESCRIPTION OF THE PREFERRED EMBODIMENTS

Now, a description will be given in more detail of preferred embodiments with reference to the accompanying drawings.

Embodiment 1

Figure 1:
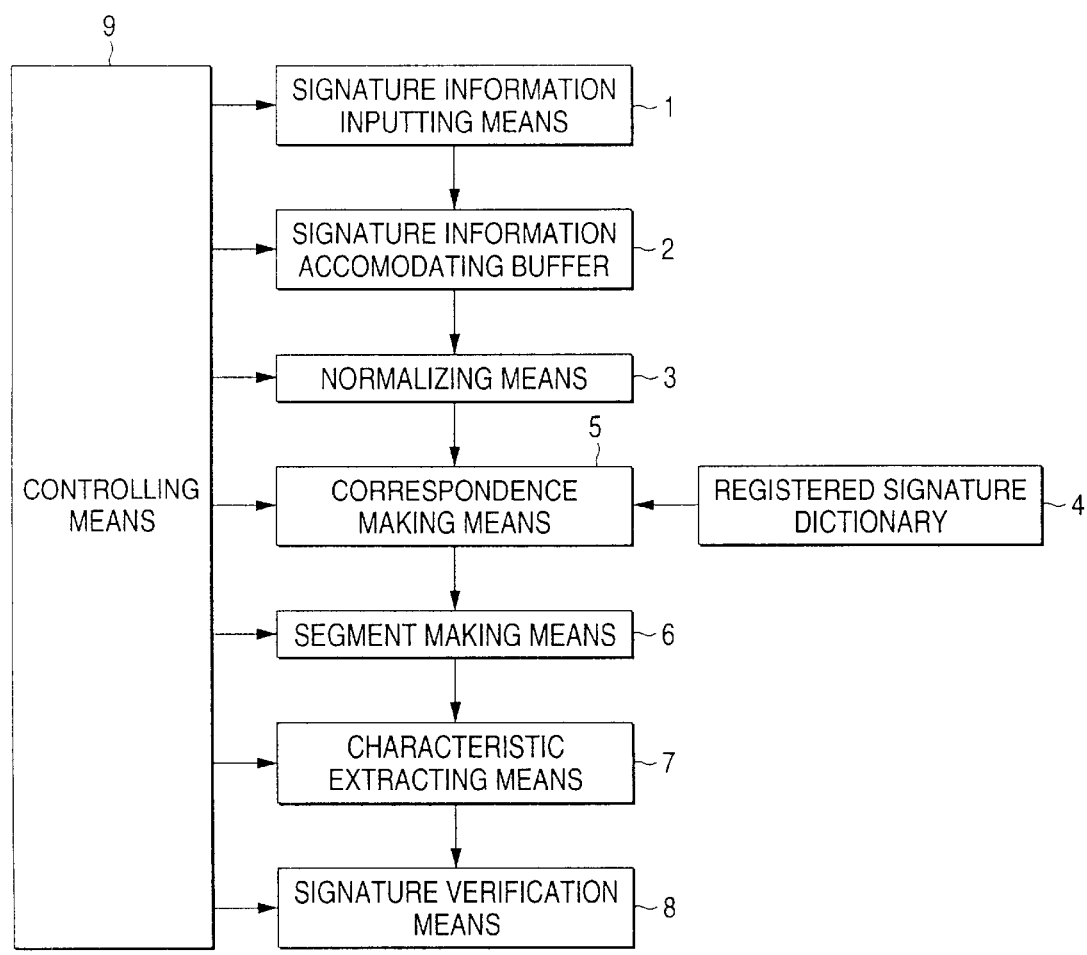
FIG. 1 is a block diagram showing an arrangement of the signature verification device of Embodiment 1 of the present invention.

FIG. 1 is a block diagram showing an arrangement of the signature verification device of Embodiment 1 of the handwriting verification device of the present invention.

In FIG. 1, the signature information input means 1 is a means for inputting the signature of a writer. Information obtained in writing is inputted into the signature information input means 1, and sampling is conducted on the thus inputted signature information at regular intervals, and the completion of inputting the signature is detected by the signature information input means 1. The signature information input means 1 is composed of, for example, an electronic pen and an integral display type tablet 10.

The signature information accommodating buffer 2 accommodates signature information which has been sampled by the signature information input means 1. In this connection, signature information accommodated in the signature information accommodating buffer 2 until the signature information input means 1 detects the completion of inputting the signature is referred to as an inputted signature in this specification hereinafter.

The normalization means 3 normalizes the inputted signature accommodated in the signature information accommodating buffer 2. In this embodiment, the normalization means 3 conducts the normalization of a position, size and number of the samples. The registered signature dictionary 4 accommodates signature information, which will be referred to as a registered signature hereinafter, which has been previously registered by the writer. The correspondence making means 5 makes correspondence of an interval between the sampling points of the inputted signature to an interval between the sampling points of the registered signature which coincide with each other, using a difference between the coordinate value of the interval of the sampling points of the inputted signature and also using the coordinate value of the interval of the sampling points of the registered signature.

The segment making means 6 makes the inputted signature and the registered signature to be a segment by allotting an interval between at least two continuous sampling points as a segment in accordance with the result of making correspondence obtained by the correspondence making means 5. In this embodiment, one interval or a plurality of intervals connecting at least two continuous sampling points, which have been made to correspond to be the same intervals between the sampling points, are allotted as one segment. In this way, the segment is made. The above segment making process is conducted on both inputted signature and registered signature, so that segment information of the entire signature is made.

The characteristic extracting means 7 extracts the characteristics of the inputted signature and the registered signature for each segment, using the segment information of inputted signature and registered signature obtained by the segment making means 6.

The handwriting verification means 8 verifies the inputted signature with the registered signature using the characteristic of each segment. The control means 9 controls the aforementioned means 1 to 8 and the signature information buffer 2 by giving commands of operation to them.

Figure 2:
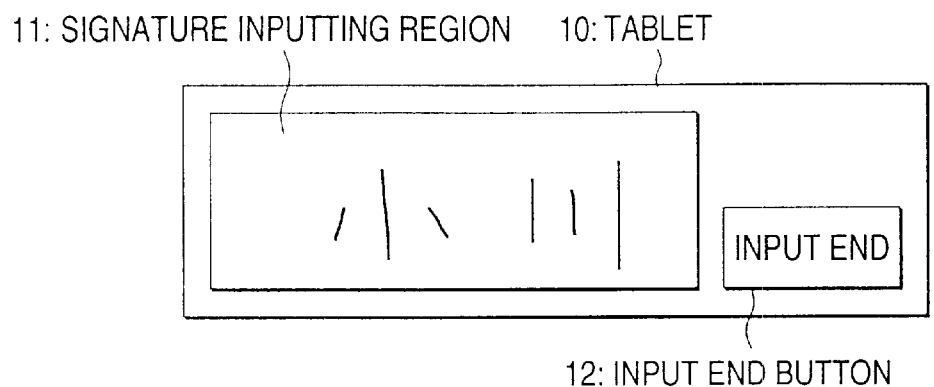
FIG. 2 is a schematic illustration showing an integral display type tablet of Embodiment 1 of the present invention.
Figure 3:
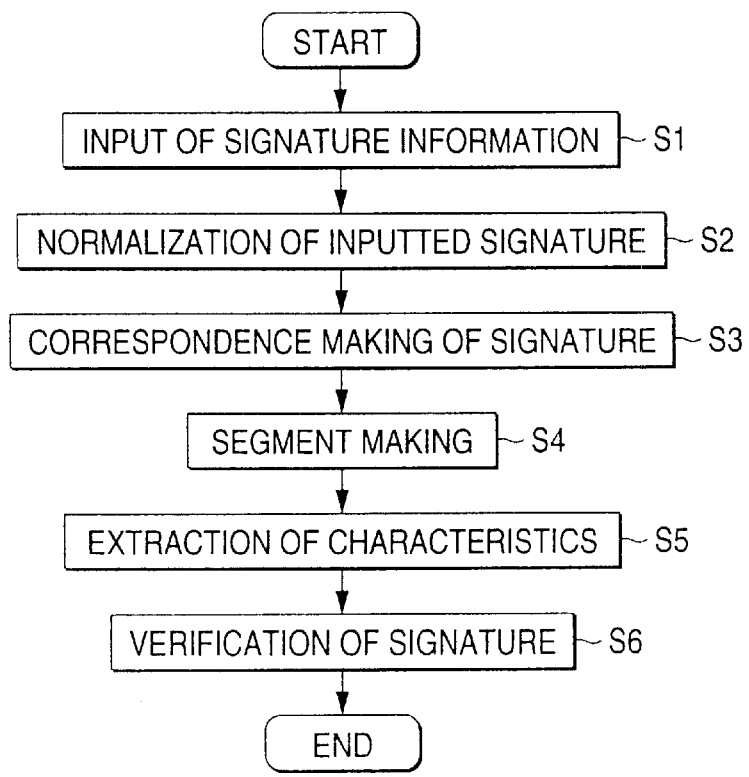
FIG. 3 is a flow chart showing a motion of the signature verification device of Embodiment 1 of the present invention.

Referring to the drawings, operation of the signature verification device composed as described above will be explained below. FIG. 2 is a schematic illustration showing an outline of the integral display type tablet 10 which is an example of the signature information input means 1. FIG. 3 is a flow chart showing the operation of the signature verification device of this embodiment.

The signature verification device composed in the manner described above is connected to, for example, the integral display type tablet 10. When a signature is written by a writer in the signature input region 11 on the tablet 10 with an electronic pen, operation is started. First, the signature information input means 1 inputs signature information in accordance with control conducted by the control means 9 (step S1). Signature information such as a position of the electronic pen on the tablet and a writing pressure of the electronic pen on the tablet are inputted into the signature information input means, and sampling is conducted on the thus inputted information at regular intervals. The thus sampled signature information is accommodated in the signature information accommodating buffer 2 by the control means 9. When the writer presses an input completion button 12, the signature information input means 1 detects the completion of inputting the signature and informs the control means 9 of the completion of inputting the signature.

When the control means 9 receives information of the completion of inputting the signature, an actual controlling operation of controlling the verification of the signature is started using the inputted signature accommodated in the signature information accommodating buffer 2.

First, according to the control conducted by the control means 9, the normalizing means 3 conducts normalization of a position, size and number of sampling points on the inputted signature accommodated in the signature information accommodating buffer 2 (step S2 ).

Normalization of a position is conducted as follows. For example, in the case where inputted signature composed of sampling points, the number of which is N, is accommodated in the signature information accommodating buffer 2, the coordinate values X(a) and Y(a) ($0 \leq a < N$) of the inputted signature are moved in parallel by formula (3), so that the coordinate value $X_{min}$ at the left end in the horizontal direction and the coordinate value $Y_{min}$ at the upper end in the vertical direction can be made 0.

$$X(a)=X(a)-X\ min$$
$$Y(a)=Y(a)-Y\ min \qquad (3)$$

Normalization of a size is conducted as follows. The coordinate values X(a) and Y(a) of the inputted signature are moved in parallel by the formula (4), so that the coordinate value $X_{max}$ at the right end in the horizontal direction and the coordinate value $Y_{max}$ at the lower end in the vertical direction can be in a predetermined range A.

$$X(a)=X(a)*(A/X\ max)$$
$$Y(a)=Y(a)*(A/Y\ max) \qquad (4)$$

Normalization of the number of the sampling points is conducted so that the number N of the sampling points of inputted signature can be a predetermined number $N_{fix}$ of the sampling points. In this example, when the sampling points are added or eliminated so that the sampling can be conducted at regular time intervals, the number of the sampling points can be normalized.

Next, according to control conducted by the control means 9, the correspondence making means 5 conducts a correspondence making operation (step S3 ). Using a difference between the coordinate value of the interval of the sampling points of the inputted signature and the coordinate value of the interval of the sampling points of the registered signature, the interval of the sampling points of inputted signature and the interval of the sampling points of registered signature are made to correspond to each other by means of dynamic programming matching. In this embodiment, a difference between the interval of the sampling points in the horizontal direction and the interval of the sampling points in the vertical direction are used as a difference of the coordinate values used for the evaluating value calculation of dynamic programming matching.

Formula (5) is a formula for finding these values. In formula (5), X(a) is a coordinate value of the sampling point in the horizontal direction, and Y(a) is a coordinate value of the sampling point in the vertical direction. Xm(a) is a difference of the interval between the sampling points, the order of which is "a", in the horizontal direction, and Ym(a) is a difference of the interval between the sampling points, the order of which is "a", in the vertical direction. In this connection, when the number of all sampling points is $N_{fix}$, the inequality $0 \leq a < (N_{fix-1})$ is satisfied.

$$X\ m(a)=X(a+1)-X(a)$$
$$Y\ m(a)=Y(a+1)-Y(a) \qquad (5)$$

Formula (6) is a numerical expression for calculating a discrepancy used in the process of dynamic programming matching. In formula (6), d(a, b) expresses a discrepancy between the interval of the sampling point, the order of which is "a", of the normalized inputted signature, and the interval of the sampling point, the order or which is "b", of the registered signature. $X_{m-inp(a)}$ expresses a difference of the interval of the sampling point, the order of which is "a", of the normalized inputted signature in the horizontal direction. $Y_{m-dic(b)}$ expresses a difference of the interval of the sampling point, the order of which is "b", of the registered signature in the horizontal direction. In formula (6), the inequality of $0 \leq a < (N_{fix-1})$ is satisfied, and also the inequality of $0 \leq b < (N_{fix-1})$ is satisfied.

As described above, in the dynamic programming matching system, calculation is conducted when only a difference between the coordinate values of the intervals of the sampling points is used. Therefore, it is possible to conduct processing at high speed.

$$d(a,\ b)=\sqrt{E^2+F^2} \qquad (6)$$

E=Xm_inp(a)−Xm_dic(b)
F=Ym_inp(a)−Ym_dic(b)

Figure 4:
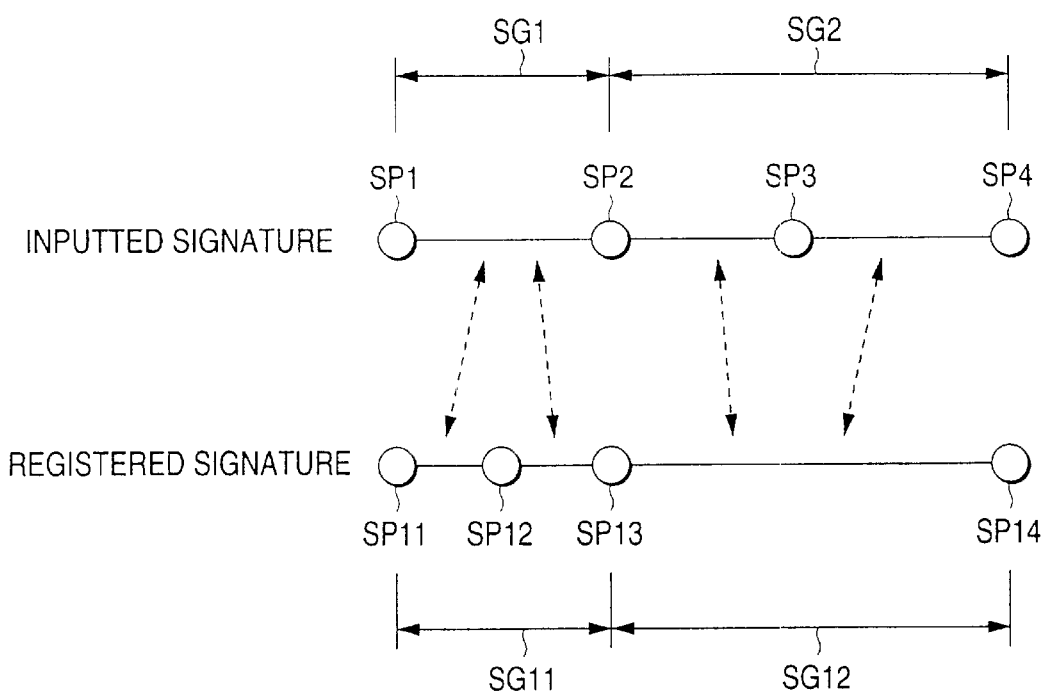
FIG. 4 is a schematic illustration used for the explanation of making correspondence of inputted signature to registered signature.
Figure 5:
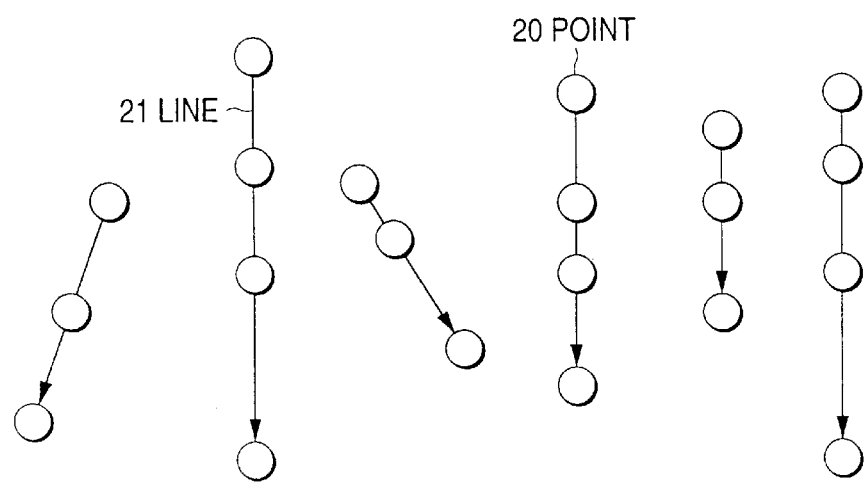
FIG. 5 is a schematic illustration showing an example of signature information obtained when writing is conducted on a tablet with an electronic pen.
Figure 6:
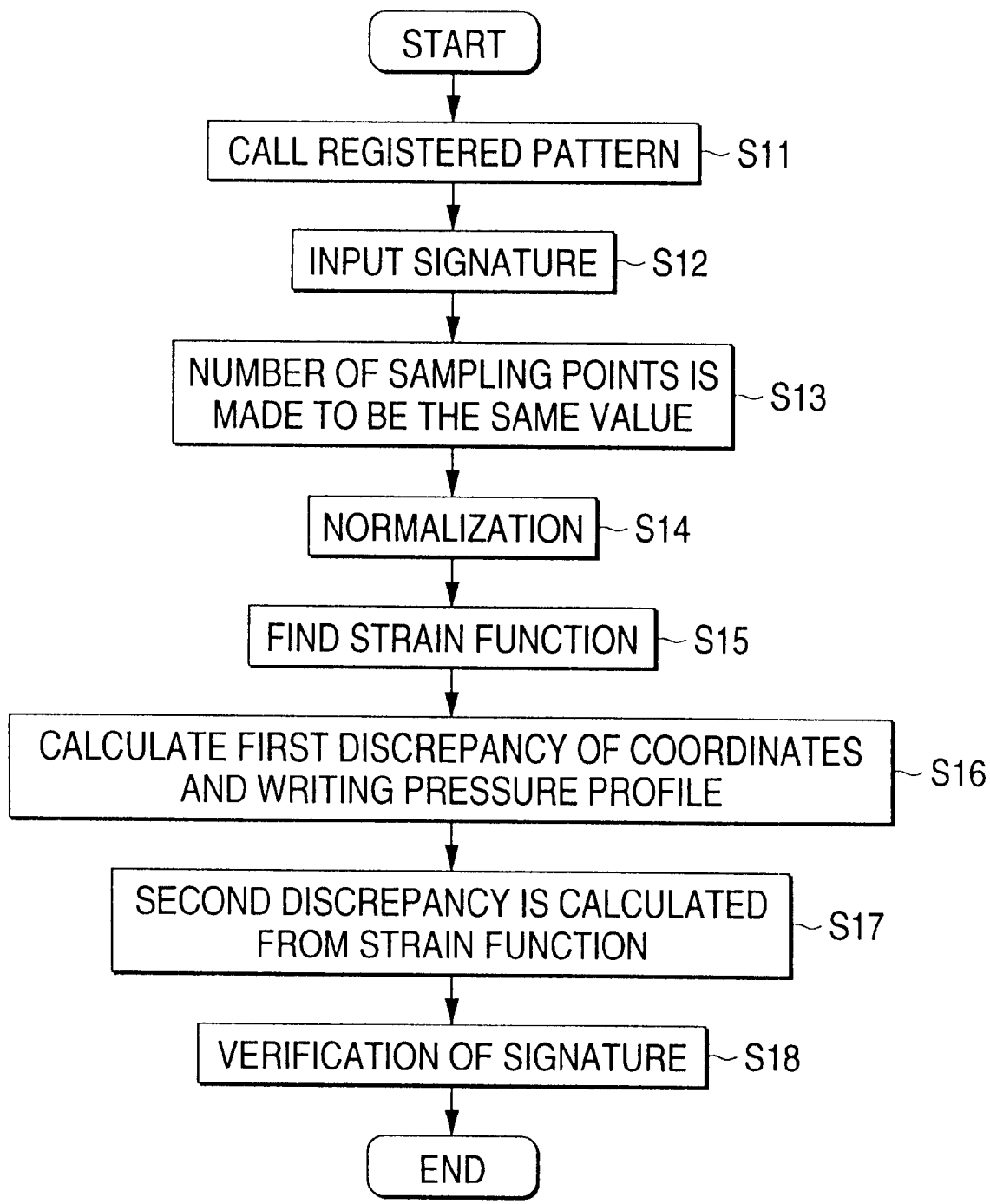
FIG. 6 is a flow chart showing a motion of the signature verification of the conventional signature verification method.

FIG. 4 is a schematic illustration showing an example of making correspondence of the inputted signature with the registered signature. As shown in FIG. 4, the correspondence making means 5 makes correspondence as follows. The first interval SP11–SP12 between the sampling points of the registered signature and the second interval SP12–SP13 between the sampling points of the registered signature are made to correspond to the first interval SP1–SP2 between the sampling points of the normalized inputted signature. The third interval SP13–SP14 between the sampling points of the registered signature is made to correspond to the second interval SP2–SP3 between the sampling points of the normalized inputted signature and the third interval SP3–SP4 between the sampling points of the normalized inputted signature.

Next, by the control conducted by the control means 9, in accordance with the result of making correspondence of the interval between the sampling points obtained by the correspondence making means 5, the normalized inputted signature and the registered signature are made to be a segment (step S4). The segment making means 6 allots one segment to one interval or a plurality of intervals between the sampling points which are made to correspond as an equal interval between the sampling points.

For example, in the case where the interval between the sampling points of the inputted signature and the interval between the sampling points of the registered signature are made to correspond to each other as shown in FIG. 4, the interval SP1–SP2 between the sampling points of the inputted signature is made to be one segment SG1, and the intervals SP11–SP12 and SP12–SP13 between the sampling points of the registered signature, which are made to correspond to the interval SP1–SP2 between the sampling points of the inputted signature, are made to be the other segment SG11.

The intervals SP2–SP3 and SP3–SP4 between the sampling points of the inputted signature are made to be one segment SG2, and the interval SP13–SP14 between the sampling points of the registered signature, which are made to correspond to the intervals SP2–SP3 and SP3–SP4 between the sampling points of the inputted signature, is made to be the other segment SG12. In the manner described above, the segment making means 6 makes the segments with respect to all intervals between the sampling points of the inputted signature and the registered signature, so that segment information can be made.

Next, according to the control conducted by the control means 9, the characteristic extracting means 7 extracts the characteristics of signature information used for the verification of the signature for each segment by using segment information made by the segment making means 6 (step S5). In this embodiment, the segment making means 6 extracts a segment length, a writing direction, a writing time, a writing speed, a change in writing pressure and an average writing pressure as the characteristics of signature information used for the verification.

In this embodiment, the segment length is a total of the length of one interval or a plurality of intervals between the sampling points in the segment. The writing direction of the segment is a direction from the sampling point, which is a starting point of the segment, to the sampling point, which is an ending point of the segment. The writing time is a number of the intervals between the sampling points in the segment. The writing speed of the segment is a value obtained when the segment length is divided by the writing time of the segment. The change in the writing pressure of the segment is a total of the differences of the writing pressure between the sampling points in the segment. The average writing pressure of the segment is an average of the writing pressure at the sampling points in the segment.

Since the characteristics are extracted from the segment as described above, it is possible to extract the characteristics which change in accordance with the changes in the writing time, the writing speed and so forth.

Next, according to the control conducted by the control means 9, the signature verification means 8 conducts the verification of the signature using the characteristic of each segment extracted by the characteristic extracting means 7 (step S6). After the verification of the signature, operation is completed. The signature verification means 8 finds a distance d from the characteristic Fc of the segment of the inputted signature to the characteristic Ac of the segment of the registered signature, so that the signature can be verified. Formula (7) is a formula in which the number of all segments is S.

$$d = \frac{1}{S} \sum_{c=1}^{S} |Fc - Ac| \qquad (7)$$

After that, for example, the degree (%) of coincidence of the signature is outputted in accordance with the thus found distance. The truth of the signature is ascertained when the thus found distance is compared with a predetermined threshold value. For example, a distance found for each type of the characteristic is compared with a predetermined threshold value of each type of the characteristic. When the distances of all characteristics are smaller than the threshold value, it is judged that the inputted signature is true, that is, it is judged that the signature was made by the person himself. When the distance of at least one characteristic exceeds the threshold value, it is judged that the inputted signature is not true, that is, it is judged that the signature was not made by the person himself.

As described above, when a writer writes down his signature on the tablet 10 with an electronic pen, the signature is inputted as an electric signal, and signature information such as a position and writing pressure of the electronic pen on the tablet is sampled at regular intervals. By means of dynamic programming matching in which a difference between the coordinate value of the interval of the sampling points of the inputted signature and the coordinate value of the interval of the sampling points of the registered signature is used, the intervals of the sampling points, which coincide with each other, can be quickly made to correspond to each other.

Using the result of making correspondence of the intervals of the sampling points, the inputted signature and the registered signature are made to be a segment, and characteristics changing in accordance with a change in time are extracted from each segment. According to the thus extracted characteristics, the inputted signature and the registered signature are verified with each other, so that the signature can be evaluated while a local difference of the signature is precisely reflected in the signature verification. After that, the result of signature verification is displayed by, for example, a verification result display means not shown in the drawing.

As described above, according to the signature verification device of this embodiment, the inputted signature and the registered signature are made to be a segment by using the result of making correspondence of the interval of the sampling points of the inputted signature to the interval of the sampling points of the registered signature, and the signature is verified by the characteristics extracted from the segment of the inputted signature and the registered signature. Due to the foregoing, a local difference of the signature can be precisely reflected in the verification of the signature, and it becomes possible to conduct a highly accurate signature verification. When the characteristics of signature information used for verification the signature is extracted from the segment, it is possible to extract the characteristics which changes in accordance with a change in time. Therefore, it is possible to verify the signature highly accurately.

When the interval between the sampling points of the inputted signature and the interval between the sampling points of the registered signature are made to correspond to each other by means of dynamic programming matching, only a difference of the coordinate value of the interval between the sampling points is used, it is possible to conduct making correspondence quickly. Therefore, it is possible to verify the signature at high speed. Even if the types of characteristics of signature information used for verification the signature is increased, it is possible to suppress an increase in the processing time. Accordingly, the signature verification can be quickly conducted.

When the segment length, writing direction, writing time, writing speed, writing pressure change and average writing pressure, which change in accordance with a change in time, are extracted as the characteristics of each segment, it is possible to conduct an accurate evaluation on the characteristics in accordance with a change in time of the signature. Therefore, the signature verification can be accurately conducted. Consequently, even when others copy a signature of the person himself after they have seen the signature, it is possible to verify the signature with high accuracy, and it is possible to ascertain the truth of the copied signature.

In this connection, the signature verification device for verification the signature is explained in this embodiment, however, it should be noted that the present invention is not limited to the above specific signature verification device. It is possible to apply the present invention to any device by which written information is verified. For example, the same effect as that of this embodiment can be provided even to a device by which handwriting of characters or marks is verified. In this case, the signature information in this embodiment is replaced with the handwriting information, and the signature information input means is replaced with the handwriting information input means for inputting handwriting information, and further the signature information accommodating buffer is replaced with a handwriting information accommodating buffer in which handwriting information is accommodated. The registered signature dictionary is replaced with a registered handwriting dictionary, and the content of the dictionary may be changed in accordance with the object to be verified, and the signature verification means may be used as a handwriting verification means for verification handwriting.

In the above embodiment, information about the electronic pen position on the tablet is inputted and also information of the writing pressure is inputted. Further, information of the inclination of the pen may be inputted and also information of pressure for holding the pen may be inputted. Due to the foregoing, it is possible to evaluate handwriting more accurately.

In the above embodiment, the writer inputs his signature with the electronic pen and tablet. However, it should be noted that the present invention is not limited to the above specific embodiment. As long as handwriting can be inputted as an electric signal, any device may adopt the present invention, that is, even when other devices or systems are used, the same effect as that of the present invention can be provided.

In the above embodiment, only the registered name "Ogawa" is registered, however, the present invention is not limited to the above specific embodiment, but even if a plurality of signatures, characters and marks are registered, the same effect can be provided. In this case, for example, not only the registered handwriting is registered in the registered handwriting dictionary but also ID information corresponding to the registered handwriting such as a name and registered number of the writer is registered. In the process of verification, handwriting and ID information are inputted, and registered handwriting, ID information of which coincides with ID information in the registered handwriting dictionary, is read out and processed. Alternatively, it is possible to adopt the following system. For example, ID information is not registered in the registered handwriting dictionary, and inputted handwriting is matched with a plurality of registered handwriting, and registered handwriting, which is most similar to inputted handwriting, is discriminated from a plurality of registered handwriting, and then the thus discriminated registered handwriting is verified with inputted handwriting.

In the above embodiment, the position is normalized, the size is normalized and the number of sampling points is normalized. However, the present invention is not limited to the above specific embodiment. Normalization may be conducted in accordance with the characteristic used when handwriting is verified. For example, one of the normalization of the position, the normalization of the size and the normalization of the number of sampling points may be adopted. Also, the normalization of writing pressure may be added.

In the above embodiment, dynamic programming matching is used when the intervals between the sampling points are made to correspond to each other. However, the present invention is not limited to the above specific embodiment. Even if other pattern matching methods are used, the same effect as that of the present invention can be provided. When the handwriting is verified, it is sufficient that the verification can be conducted using the characteristics of segments, which are opposed to each other, of inputted handwriting and registered handwriting. For example, handwriting may be verified while one stroke is determined to be one segment. In this case, the intervals between the sampling points are not accurately made to correspond to each other. Therefore, the accuracy of handwriting verification is deteriorated, however, it becomes possible to conduct handwriting verification quickly because an amount of calculation necessary for pattern matching is decreased.

In the above embodiment, the interval of sampling points of the inputted signature and the interval of sampling points of registered signature, which coincide with each other, are made to correspond to each other by the correspondence making means. However, the present invention is not limited to the above specific embodiment, and a portion of inputted handwriting and a portion of registered handwriting, which coincide with each other, may be made to correspond to each other. For example, even if the correspondence making means makes correspondence of the sampling point of inputted handwriting to the sampling point of registered handwriting, the same effect can be provided. In this case, the segment making means respectively makes a segment of inputted handwriting and a segment of registered handwriting in accordance with the result of making correspondence of the sampling points.

In the above embodiment, only the characteristics which change in accordance with a change in time are extracted as the characteristics of each segment used for verification. However, the present invention is not limited to the above specific embodiment. For example, the coordinate values at both ends of each segment or the writing pressure may be extracted as a characteristic, so that information of the profile of handwriting can be accurately evaluated. In this case, for example, the writing pressure of inputted handwriting is normalized. The coordinate values at both ends of each segment, in which inputted handwriting and registered handwriting are made to correspond to each other, and the distance of the writing pressure are found and verified with each other.

In the above embodiment, all segments are used for verification a signature. However, it should be noted that the present invention is not limited to the above specific embodiment. The segments corresponding to both end portions of a stroke, which tend to become unstable in the case of writing, may not be used. For example, when the characteristics are extracted from the segment, the segment corresponding to a length of ±10% of each stroke may be excluded from the object. In this case, when a portion which becomes unstable in the process of verification of handwriting is eliminated, it is possible to verify handwriting more accurately, and it becomes possible to reduce an amount of calculation necessary for extracting the characteristics and verification handwriting. Accordingly, the verification of handwriting can be conducted at higher speed.

As described above, the following effects can be provided by the handwriting verification device of the present invention. A portion of inputted handwriting and a portion of registered handwriting, which coincide with each other, are made to correspond to each other. According to the result of making correspondence, the inputted handwriting and registered handwriting are respectively made to be a segment, and the characteristics extracted from the segments of inputted handwriting and registered handwriting are used so as to verify handwriting. Due to the foregoing, a local difference of the characteristics of handwriting can be precisely reflected in the verification of handwriting. Therefore, it is possible to verify handwriting with high accuracy. When the characteristics of handwriting information used for the verification of handwriting are extracted from the segments, it is possible to extract the characteristics which change in accordance with a change in time. Therefore, the verification of handwriting can be verified with high accuracy.

According to the handwriting verification device of another aspect of the invention, in addition to the effects described above, when a portion of input handwriting and a portion of registered handwriting, which coincide with each other, are made to correspond to each other, processing of making correspondence can be conducted at high speed by using a difference between the coordinate value of the interval of the sampling points of inputted handwriting and the coordinate value of the interval of the sampling points of registered handwriting. Accordingly, it is possible to verify handwriting at higher speed. Even if the types of characteristics of handwriting information used for the verification is increased, it is possible to suppress an increase in the processing time. Accordingly, the handwriting verification can be quickly conducted.

According to the handwriting verification device of another aspect of the invention, in addition to the effects described above, the characteristic extracting means extracts at least characteristics which change in accordance with a change in time. Due to the foregoing, the characteristics of handwriting accompanied by a change in time can be accurately evaluated. Therefore, it is possible to conduct the verification of handwriting with high accuracy.

According to the handwriting verification device of another aspect of the invention, in addition to the effects described above, when the characteristic extracting means extracts at least the characteristics of both ends of the segment, it is possible to evaluate handwriting more accurately. Therefore, it is possible to conduct the verification of handwriting with high accuracy.

According to the handwriting verification device of another aspect of the invention, in addition to the effects described above, when handwriting is verified using the characteristics of each segment, a portion of the segment is excluded from the object. Due to the foregoing, the verification of handwriting can be conducted with higher accuracy, and processing of the verification of handwriting can be performed at higher speed.

What is claimed is:

1. A handwriting verification device comprising:
   a normalizing means for normalizing an inputted handwriting which has been subjected to sampling at regular intervals;
   a registered handwriting dictionary in which registered handwriting is accommodated;
   a correspondence making means for making the inputted handwriting, which has been normalized in accordance with the sampling points in the sampling, correspond to the registered handwriting, so that a portion of the inputted handwriting and a portion of the registered handwriting, which coincide with each other, are made to correspond to each other;
   a segment making means for making the inputted handwriting and the registered handwriting into a segment by allotting an interval between at least two continuous sampling points as a segment in accordance with the result of making correspondence;
   a characteristic extracting means for extracting the characteristics of the inputted handwriting and the registered handwriting for each segment; and
   a handwriting verification means for verifying the inputted handwriting with the registered handwriting using the characteristics of each segment,
   wherein said correspondence making means makes correspondence using a difference between coordinate values of sampling points of the inputted handwriting, and a difference between coordinate values of sampling points of the registered handwriting.

2. A handwriting verification device according to claim 1, wherein said characteristic extracting means extracts at least the characteristics that change in accordance with a change in time.

3. A handwriting verification device according to claim 2, wherein said characteristics are segment length, a writing direction, a writing time, a writing speed, a change in writing pressure, and an average writing pressure.

4. A handwriting verification device according to claim 1, wherein said characteristic extracting means extracts at least the characteristics of both ends of the segment.

5. A handwriting verification device according to claim 1, wherein said handwriting verification means conducts verification while excluding a portion of the segments when verification is conducted using the characteristic of each segment.

6. A handwriting verification device according to claim 1, wherein said normalizing means normalizes a position, size and number of samples.

7. A handwriting verification device according to claim 1, wherein said correspondence making means calculates a discrepancy between the interval of the sampling point of the input signature and the interval of the sampling point of the registered signature.

8. A handwriting verification device according to claim 1, wherein said handwriting verification means outputs a degree of coincidence of the inputted handwriting with the registered handwriting.

9. A handwriting verification device according to claim 1, wherein the inputted handwriting comprises a position and writing pressure of an electronic pen sampled at regular intervals.

10. A handwriting verification device according to claim 9, wherein said normalizing means normalizes the writing pressure.

11. A handwriting verification device comprising:
- a normalizing device for normalizing an inputted handwriting which has been subjected to sampling at regular intervals;
- a correspondence making device for making the inputted handwriting, which has been normalized, correspond to registered handwriting, so that a portion of the inputted handwriting and a portion of the registered handwriting, which coincide with each other, are made to correspond to each other;
- a verification device for allotting the resulting corresponding portions of inputted handwriting and registered handwriting as segments, extracting characteristics for each segment, and verifying the inputted handwriting with the registered handwriting using the characteristics of each segment,
- wherein said correspondence making device makes correspondence using a difference between a coordinate value between the sampling points of the inputted handwriting, and a difference between a coordinate value between the sampling points of the registered handwriting.

12. A handwriting verification device according to claim 11, wherein said verification device extracts at least the characteristics that change in accordance with a change in time.

13. A handwriting verification device according to claim 12, wherein said characteristics are segment length, a writing direction, a writing time, a writing speed, a change in writing pressure, and an average writing pressure.

14. A handwriting verification device according to claim 11, wherein said verification device extracts at least the characteristics of both ends of the segment.

15. A handwriting verification device according to claim 11, wherein said normalizing device normalizes a position, size and number of samples.

16. A handwriting verification device according to claim 11, wherein said correspondence making device calculates a discrepancy between the interval of the sampling point of the input signature and the interval of the sampling point of the registered signature.

17. A handwriting verification device according to claim 11, wherein said verification device outputs a degree of coincidence of the inputted handwriting with the registered handwriting.

18. A handwriting verification device according to claim 11, wherein the inputted handwriting comprises a position and writing pressure of an electronic pen sampled at regular intervals.

19. A handwriting verification device according to claim 18, wherein said normalizing device normalizes the writing pressure.

* * * * *